United States Patent
Ochiai (10) Patent No.: US 7,372,686 B2
(45) Date of Patent: May 13, 2008

(54) POWER SUPPLY APPARATUS CAPABLE OF DETECTING ABNORMALITY IN CURRENT FLOWING IN DRIVE CIRCUIT

(75) Inventor: Kiyoe Ochiai, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 183 days.

(21) Appl. No.: 11/146,352

(22) Filed: Jun. 7, 2005

(65) Prior Publication Data
US 2005/0286181 A1 Dec. 29, 2005

(30) Foreign Application Priority Data
Jun. 25, 2004 (JP) ............ 2004-188393

(51) Int. Cl.
*H02H 3/08* (2006.01)
*H02H 5/04* (2006.01)

(52) U.S. Cl. ................. 361/93.1; 361/23

(58) Field of Classification Search ........ 361/23, 361/30, 31, 93.1; 318/798, 650
See application file for complete search history.

(56) References Cited

U.S. PATENT DOCUMENTS 4,180,841 A * 12/1979 Engel ............... 361/45
5,461,531 A * 10/1995 Tuchiya et al. ........... 361/28
5,847,534 A * 12/1998 Tanamachi et al. ....... 318/801
5,880,574 A * 3/1999 Otsuka et al. ........... 318/811
6,339,310 B1 * 1/2002 Sugiyama et al. ........ 318/783

FOREIGN PATENT DOCUMENTS

| CH | 663678 A5 * | 12/1987 |
| JP | A 3-128618 | 5/1991 |
| JP | A 7-123504 | 5/1995 |
| JP | A 09-308078 | 11/1997 |

* cited by examiner

*Primary Examiner*—Michael Sherry
*Assistant Examiner*—Boris Benenson
(74) *Attorney, Agent, or Firm*—Oliff & Berridge, PLC (57) ABSTRACT

A current detection unit samples motor current at every cycle corresponding to a cycle of the highest processing speed of a CPU. A current integral calculation unit integrates the value of the sampled motor current over a sampling period to calculate and output a current integral to an abnormality determination unit. The abnormality determination unit determines whether the current integral is larger than a threshold. When the abnormality determination unit determines that the current integral is larger than the threshold, it generates a detection signal indicating an abnormality in the motor current and outputs the signal to a relay drive unit and a notification unit. The relay drive unit receives the detection signal to generate a signal for turning off a system relay. The notification unit receives the detection signal to generate and output a signal to display means provided outside a power supply apparatus.

3 Claims, 10 Drawing Sheets

| CONTROL MODE | CARRIER FREQUENCY | ls_std |
|---|---|---|
| PWM CONTROL | 5kHz | 25A·sec |
| OVERMODULATION CONTROL | 2.5kHz | 50A·sec |
| RECTANGULAR-WAVE CONTROL |  | 100A·sec |

POWER SUPPLY APPARATUS CAPABLE OF DETECTING ABNORMALITY IN CURRENT FLOWING IN DRIVE CIRCUIT

This nonprovisional application is based on Japanese Patent Application No. 2004-188393 filed with the Japan Patent Office on Jun. 25, 2004, the entire contents of which are hereby incorporated by reference.

BACKGROUND OF THE INVENTION

1. Field of the Invention

The present invention relates to a power supply apparatus and particularly to a power supply apparatus having the function of detecting an abnormality in electric current flowing in a drive circuit mounted on the power supply apparatus.

2. Description of the Background Art

Hybrid vehicles and electric vehicles have recently been of great interest as environment-friendly motor vehicles. A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well.

An electric vehicle refers to a motor vehicle that has, as its motive power sources, a DC power supply, an inverter and a motor driven by the inverter.

The hybrid vehicles and electric vehicles generally use a high-voltage power supply for producing high power. When the high-voltage power supply is used, overload could cause overheating to incur the danger that an electric motor seizes up or burns out. Moreover, when an electric leakage occurs, there arises the danger of an electrical shock. A safety device is thus required for avoiding these dangers (for example, see Japanese Patent Laying-Open No. 07-123504).

Figure 11:
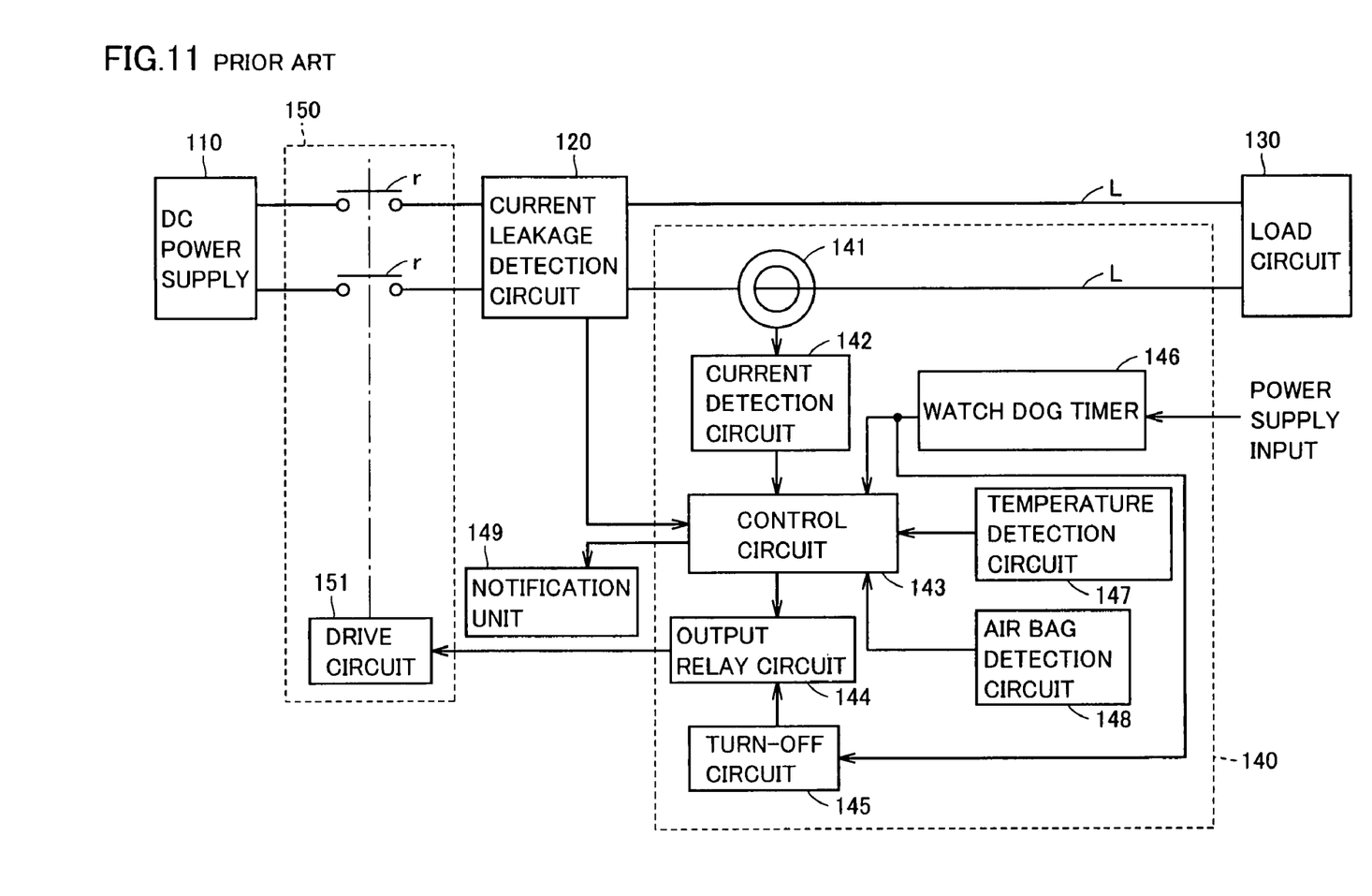
FIG. 11 is a block diagram showing a configuration of a safety device for electric vehicles disclosed in Japanese Patent Laying-Open No. 07-123504.

FIG. 11 is a block diagram showing a configuration of a safety device for electric vehicles (hereinafter referred to as EV safety device) disclosed in Japanese Patent Laying-Open No. 07-123504.

Referring to FIG. 11, the EV safety device is configured to have a switch 150 on a power feeding path L extending from a DC power supply 110 to a load circuit 130 and open/close switch 150 according to an external signal that is input from a protection circuit 140 to a drive circuit 151.

More specifically, in protection circuit 140, a current detector 141 detects electric current passing through power feeding path L. The output of current detector 141 is amplified by a current detection circuit 142 and input to a control circuit 143. At the time when predetermined operating time has passed since the time when the value of the detected electric current exceeds the rated electric current of load circuit 130, if the value of the detected electric current decreases to become equal to or lower than the rated current, control circuit 143 drives an output relay circuit 144 and turns off a contact r of switch 150 through drive circuit 151.

Here, the operating time refers to a time limit from the time when the value of the electric current detected by current detector 141 exceeds the rated electric current. The operating time is set to allow switch 150 to be opened if the detected current value does not fall to or below the rated current at the time when the operating time has passed. Further, the operating time is set, according to the magnitude of the passing electric current, so that the operating time is shorter in an inversely proportional manner as the current value is larger for example. If the detected electric current falls to or below the rated current within the time limit of the operating time, switch 150 is not opened. Then, the next time the detected current exceeds the rated current, the time limit is newly set.

Regarding the EV safety device shown in FIG. 11, if it is detected that the passing current exceeds the rated current and the passing current does not fall to or below the rated current within a predetermined operating time from the time of the detection, the power feeding to load circuit 130 is stopped to accordingly afford protection against overcurrent.

Until the time when the operating time has passed, the power feeding to load circuit 130 is continued. Thus, even if load circuit 130 is temporarily in an overloaded state, the power feeding to load circuit 130 is not immediately stopped. Therefore, such an inconvenience that protection circuit 140 operates in a normal state to stop the power feeding is avoided.

According to the method of detecting an abnormality illustrated in FIG. 11, however, whether the passing current is abnormal or not is determined based on the rated current and the operating time that is uniquely determined according to the magnitude of the passing current, and accordingly a problem arises in precision of detecting the abnormality in the following respects.

Specifically, as load circuit 130 in FIG. 11, if an inverter and an AC motor are provided, the passing current has a sinusoidal current waveform in a normal operation. When an abnormality occurs in control of the inverter, the passing current has its waveform considerably different from the one the current should have.

Examples of the passing current in an abnormal state include electric current having a current waveform temporarily exceeding the rated current to a considerably great degree and electric current having a current waveform continuing around the uppermost level of the sinusoidal wave. When large electric current that exceeds the rated current flows in the inverter, a large load is exerted temporarily on the inverter depending on the magnitude of the passing current and the period of time during which the current flows, which could break the inverter. In the case where the passing current continuously flows having its level around the uppermost level of the sinusoidal wave, the load with the maximum level in a normal state is continuously exerted on the inverter, which could also break the inverter. In order to prevent the inverter from being broken, it is necessary to surely determine that any current waveform that never occurs in a normal operating state is abnormal.

According to the aforementioned method of detecting an abnormality, any abnormal electric current that flows with its level temporarily exceeding the rated current to a considerably great degree is regarded as abnormal if such abnormal current flows for more than a predetermined operating time.

For such abnormal current flowing continuously with its level around the uppermost level of the sinusoidal wave, it is necessary to lower the threshold used as a reference in determining whether an abnormality occurs or not, from the rated current to the uppermost level of the sinusoidal wave. However, if the threshold value is set at the uppermost level of the sinusoidal wave, it is difficult to accurately detect the abnormal current flowing at and around the uppermost level of the sinusoidal wave, since the time-limit setting is initialized when the passing current falls to or below the threshold value within the time limit of the operating time and the time limit is newly set the next time the current exceeds the threshold value. In other words, depending on the setting of the operating time, if the operating time is relatively short, the passing current that temporarily exceeds the uppermost level of the sinusoidal wave that should merely exert a small load on the inverter could be detected as abnormal current. On the contrary, if the operating time is relatively long, any passing current that continuously flows with its level around the uppermost level of the sinusoidal wave and that exerts a large load on the inverter could not be detected as abnormal current, since the time-limit setting is initialized. As such, the above-described method of detecting an abnormality has a problem that the pattern of abnormal current that is not preferable for the inverter does not necessarily match the result of determining whether an abnormality occurs or not.

SUMMARY OF THE INVENTION

An object of the present invention is to provide a power supply apparatus that can accurately detect an abnormality in electric current flowing in a drive circuit that drives a load.

According to the present invention, a power supply apparatus includes: a power supply; a drive circuit receiving electric power from the power supply to drive a load circuit; and an abnormal current detection circuit detecting an abnormality in drive current flowing in the drive circuit. The abnormal current detection circuit detects that a current integral of the drive current is larger than a predetermined threshold to determine that the drive current is abnormal.

Preferably, the power supply apparatus further includes a switch performing a switching operation to electrically connect/disconnect the power supply and the drive circuit to/from each other. When the abnormal current detection circuit determines that the drive current is abnormal, the abnormal current detection circuit controls the switching operation to electrically disconnect the power supply and the drive circuit from each other.

Preferably, the predetermined threshold is lower than a current integral of the drive current that causes the drive circuit to be broken.

Preferably, the abnormal current detection circuit includes: a current detection unit for sampling the drive current at every predetermined calculation cycle; a current integral calculation unit for integrating the sampled drive current over a plurality of the predetermined calculation cycles consumed for the sampling to calculate the current integral of the drive current; and an abnormality determination unit for determining whether the current integral of the drive current is larger than the predetermined threshold, detecting that the current integral of the drive current is larger than the predetermined threshold and determining that the drive current is abnormal.

Preferably, the predetermined calculation cycle includes a cycle of a highest operating speed at which the abnormal current detection circuit can operate.

Preferably, the load circuit includes an AC motor, the abnormal current detection circuit includes a mode determination unit for determining a control mode of the AC motor. The mode determination unit determines a control mode of the AC motor when the drive current that is out of a normal operating range flows. The abnormality determination unit adjusts the predetermined threshold to an appropriate threshold that is appropriate for the determined control mode, determines whether the current integral of the drive current is larger than the appropriate threshold, detects that the current integral of the drive current is larger than the appropriate threshold, and determines that the drive current is abnormal.

Preferably, the mode determination unit determines the control mode among control modes with respective carrier frequencies different from each other.

Preferably, the abnormality determination unit adjusts the threshold according to the carrier frequency of the determined control mode.

In accordance with the present invention, based on the fact that the current integral of the drive current exceeds a predetermined threshold, it is determined that the drive current is abnormal. Therefore, as compared with the conventional abnormality determination method determining that the passing current is abnormal based on the phase thereof in a single operating time period, the present invention can more accurately detect abnormal current that overloads the drive circuit.

Further, the predetermined threshold used for determining whether the drive current is abnormal or not is set based on the load on the drive circuit that is exerted when an abnormality occurs. Therefore, regardless of the waveform of the abnormal current, the drive circuit can surely be protected.

Furthermore, the predetermined threshold is adjusted according to the control mode of the AC motor. Therefore, an abnormality can precisely be detected regardless of the waveform of the abnormal current to strength the protection of the drive circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described in detail with reference to the drawings. In the drawings, like components are denoted by like reference characters.

First Embodiment

Figure 1:
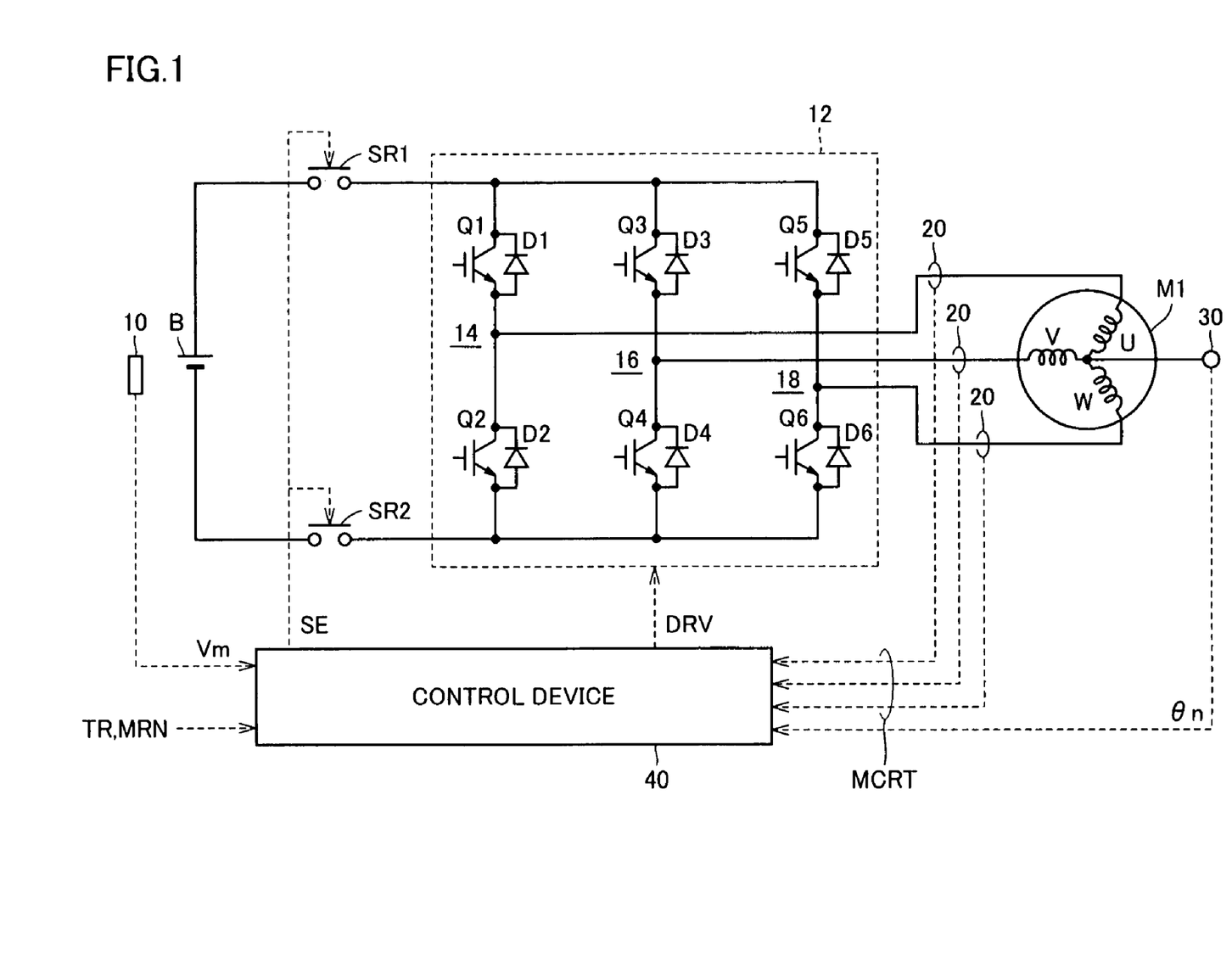
FIG. 1 is a schematic block diagram of a power supply apparatus according to a first embodiment of the present invention.

FIG. 1 is a schematic block diagram of a power supply apparatus according to a first embodiment of the present invention.

Referring to FIG. 1, the power supply apparatus includes a DC power supply B, a voltage sensor 10, an inverter 12, a current sensor 20, a resolver 30, and a control device 40.

An AC motor M1 is a drive motor that generates torque for driving drive wheels of a hybrid vehicle or electric vehicle. AC motor M1 also serves as an electric generator driven by an engine and as an electric motor for the engine to start the engine for example.

Inverter 12 includes a U phase arm 14, a V phase arm 16 and a W phase arm 18. U phase arm 14, V phase arm 16 and W phase arm 18 are provided in parallel between a power supply line and a ground line.

U phase arm 14 is comprised of NPN transistors Q1, Q2 connected in series, V phase arm 16 is comprised of NPN transistors Q3, Q4 connected in series, and W phase arm 18 is comprised of NPN transistors Q5, Q6 connected in series. Between respective collectors and emitters of NPN transistors Q1 to O6, diodes D1 to D6 for allowing current to flow from the emitter to the collector are connected respectively.

The intermediate point of each phase arm is connected to one end of a corresponding one of phase coils of AC motor M1. Specifically, AC motor M1 is a three-phase permanent-magnet motor and, one end of a U phase coil, one end of a V phase coil and one end of a W phase coil are connected at the common central junction, while the other end of the U phase coil is connected to an intermediate point between NPN transistors Q1, Q2, the other end of the V phase coil is connected to an intermediate point between NPN transistors Q3, Q4, and the other end of the W phase coil is connected to an intermediate point between NPN transistors Q5, Q6.

DC power supply B is comprised of secondary or rechargeable cell(s), for example, of nickel hydride or lithium ion. Voltage sensor 10 detects a voltage Vm that is output from DC power supply B to output the detected voltage Vm to control device 40.

System relays SR1, SR2 are turned on/off according to a signal SE from control device 40.

When a DC voltage is supplied from DC power supply B, inverter 12 converts the DC voltage into an AC voltage based on a drive signal DRV from control device 40 so as to drive AC motor M1. Accordingly, AC motor M1 is driven to generate torque specified by a torque command value TR.

Further, in the regenerative braking mode of the hybrid vehicle or electric vehicle having the power supply apparatus mounted thereon, inverter 12 converts an AC voltage generated by AC motor M1 into a DC voltage based on signal DRV from control device 40 and supplies the resultant DC voltage to DC power supply B.

The regenerative braking here includes braking accompanied by regenerative power generation that is effected when a driver of the hybrid vehicle or electric vehicle steps on the foot brake as well as deceleration (or stop of acceleration) accompanied by regenerative power generation that is effected when the driver releases the accelerator pedal without operating the foot brake.

Current sensor 20 detects motor current MCRT flowing through AC motor M1 to output the detected motor current MCRT to control device 40.

Resolver 30 is attached to the rotational shaft of AC motor M1 to detect rotational angle θn of the rotor of AC motor M1 and output the detected angle to control device 40.

Control device 40 receives, from an external ECU (Electrical Control Unit), torque command value TR and motor revolution number (number of revolutions of the motor) MRN, receives voltage Vm from voltage sensor 10, receives motor current MCRT from current sensor 20, and receives rotational angle θn from resolver 30.

Control device 40 uses rotational angle θn from resolver 30, torque command value TR and motor current MCRT to generate drive signal DRV for driving NPN transistors Q1-Q6 of inverter 12 and output the generated drive signal DRV to inverter 12.

Further, in the regenerative braking mode of the hybrid vehicle or electric vehicle having the power supply apparatus mounted thereon, control device 40 generates, based on rotational angle θn, torque command value TR and motor current MCRT, drive signal DRV for converting an AC voltage generated by AC motor M1 into a DC voltage, and outputs the generated drive signal DRV to inverter 12. In this case, switching of NPN transistors Q1 to Q6 of inverter 12 is controlled by drive signal DRV. Accordingly, inverter 12 converts the AC voltage generated by AC motor M1 into the DC voltage and supplies the DC voltage to. DC power supply B.

Figure 2:
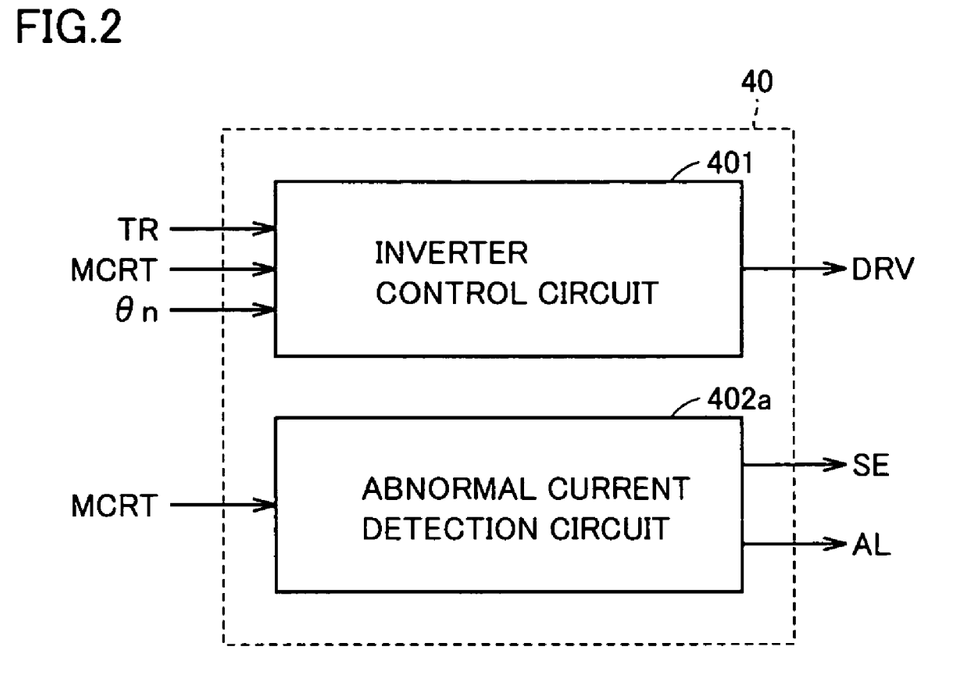
FIG. 2 is a block diagram of a control device 40 in FIG. 1.

FIG. 2 is a block diagram of control device 40 in FIG. 1.

Referring to FIG. 2, control device 40 includes an inverter control circuit 401 and an abnormal current detection circuit 402a.

Inverter control circuit 401 generates, based on rotational angle θn, torque command value TR and motor current MCRT, drive signal DRV for turning on/off NPN transistors Q1 to Q6 of inverter 12 when AC motor M1 is driven, and outputs the generated signal DRV to inverter 12.

Further, in the regenerative braking mode of the hybrid vehicle or electric vehicle having the power supply apparatus mounted thereon, inverter control circuit 401 generates, based on rotational angle θn, torque command value TR and motor current MCRT, drive signal DRV for converting the AC voltage generated by AC motor M1 into the DC voltage, and outputs the generated drive signal DRV to inverter 12.

Abnormal current detection circuit 402a samples motor current MCRT detected by current sensor 20 and detects an abnormality occurring in motor current MCRT based on the level of the sampled current. When abnormal current detection circuit 402a detects an abnormality in motor current MCRT, the circuit generates signal SE for turning off system relays SR1, SR2 and outputs the generated signal SE to system relays SR1, SR2. Further, abnormal current detection circuit 402a generates a signal AL for notifying a user of the occurrence of the abnormality and outputs the generated signal AL to the outside of the power supply apparatus.

Figure 3:
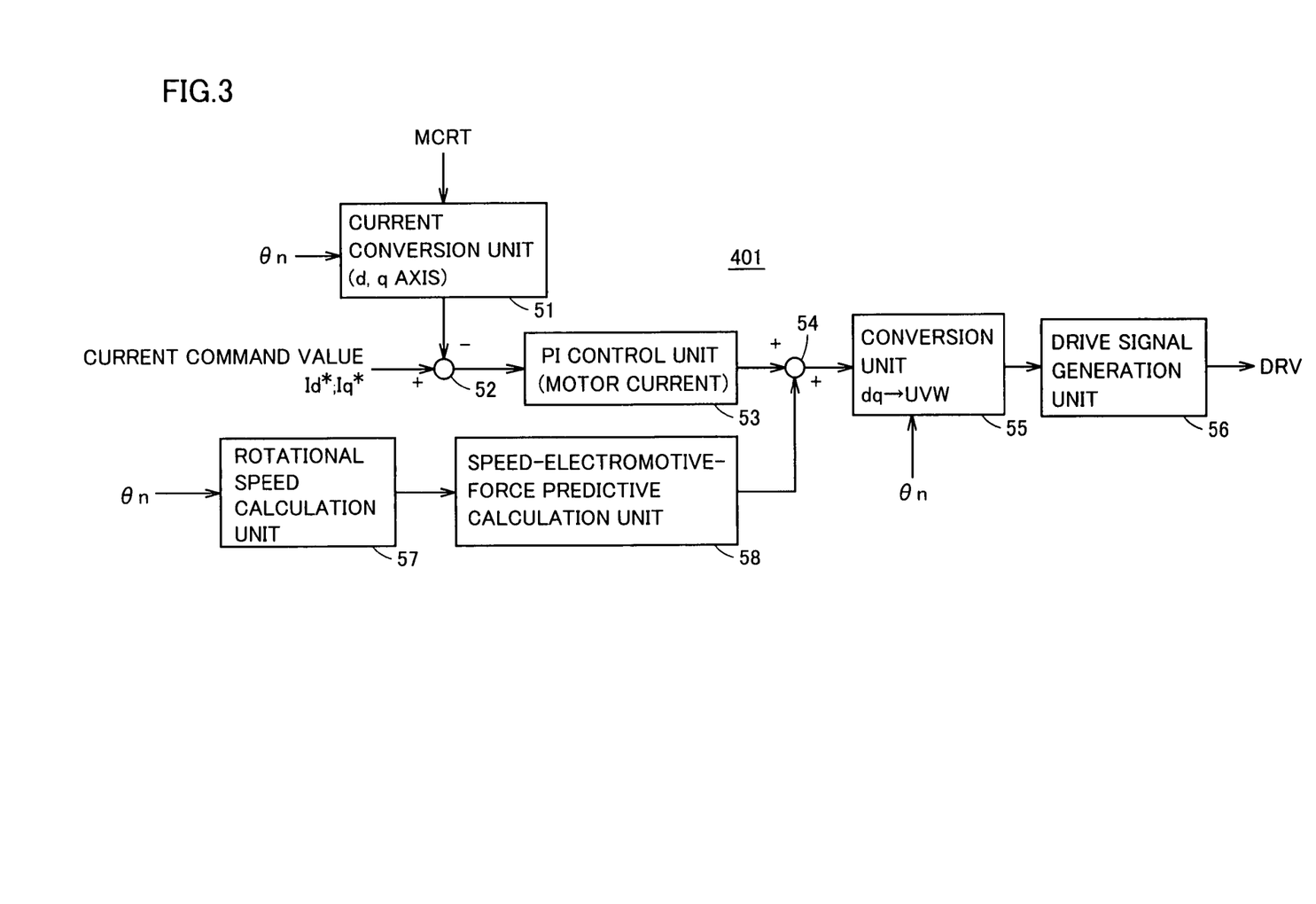
FIG. 3 is a control block diagram of an inverter control circuit 401 in FIG. 2.

FIG. 3 is a control block diagram of inverter control circuit 401 shown in FIG. 2.

Referring to FIG. 3, inverter control circuit 401 includes a current conversion unit 51, a subtracter 52, a PI control unit 53, a rotational speed calculation unit 57, a speed-electromotive-force predictive calculation unit 58, an adder 54, a conversion unit 55, and a drive signal generation unit 56.

Current conversion unit 51 uses rotational angle θn that is output from resolver 30 to perform three-to-two phase conversion on motor current MCRT detected by current sensor 20. Specifically, current conversion unit 51 uses rotational angle θn to transform three-phase-motor current MCRT flowing in each phase of AC motor M1 into current values Id, Iq of d-axis and q-axis current to output the resultant values to subtracter 52.

Subtracter 52 subtracts, from current command values Id*, Iq* for AC motor M1 to output the torque specified by torque command value TR, current values Id, Iq from current conversion unit 51 to determine deviations ΔId, ΔIq.

PI control unit 53 uses a PI gain for deviations ΔId, ΔIq to calculate a control amount for adjusting the motor current.

Rotational speed calculation unit 57 calculates, based on rotational angle θn from resolver 30, the rotational speed of AC motor M1 to output the calculated rotational speed to speed-electromotive-force predictive calculation unit 58. Speed-electromotive-force predictive calculation unit 58 calculates a predicted value of speed electromotive force based on the rotational speed from rotational speed calculation unit 57.

Adder 54 calculates the sum of the control amount for adjusting the motor current from PI control unit 53 and the predicted value of the speed electromotive force from speed-electromotive-force predictive calculation unit 58 to determine voltage control amounts Vd, Vq to be applied to the d and q axes.

Conversion unit 55 uses control amounts Vd, Vq of the voltage applied to the d axis and the q axis to convert the control amounts into control amounts of the voltage applied to the three-phase coils of AC motor M1. Drive signal generation unit 56 generates drive signal DRV based on the output from conversion unit 55.

Figure 4:
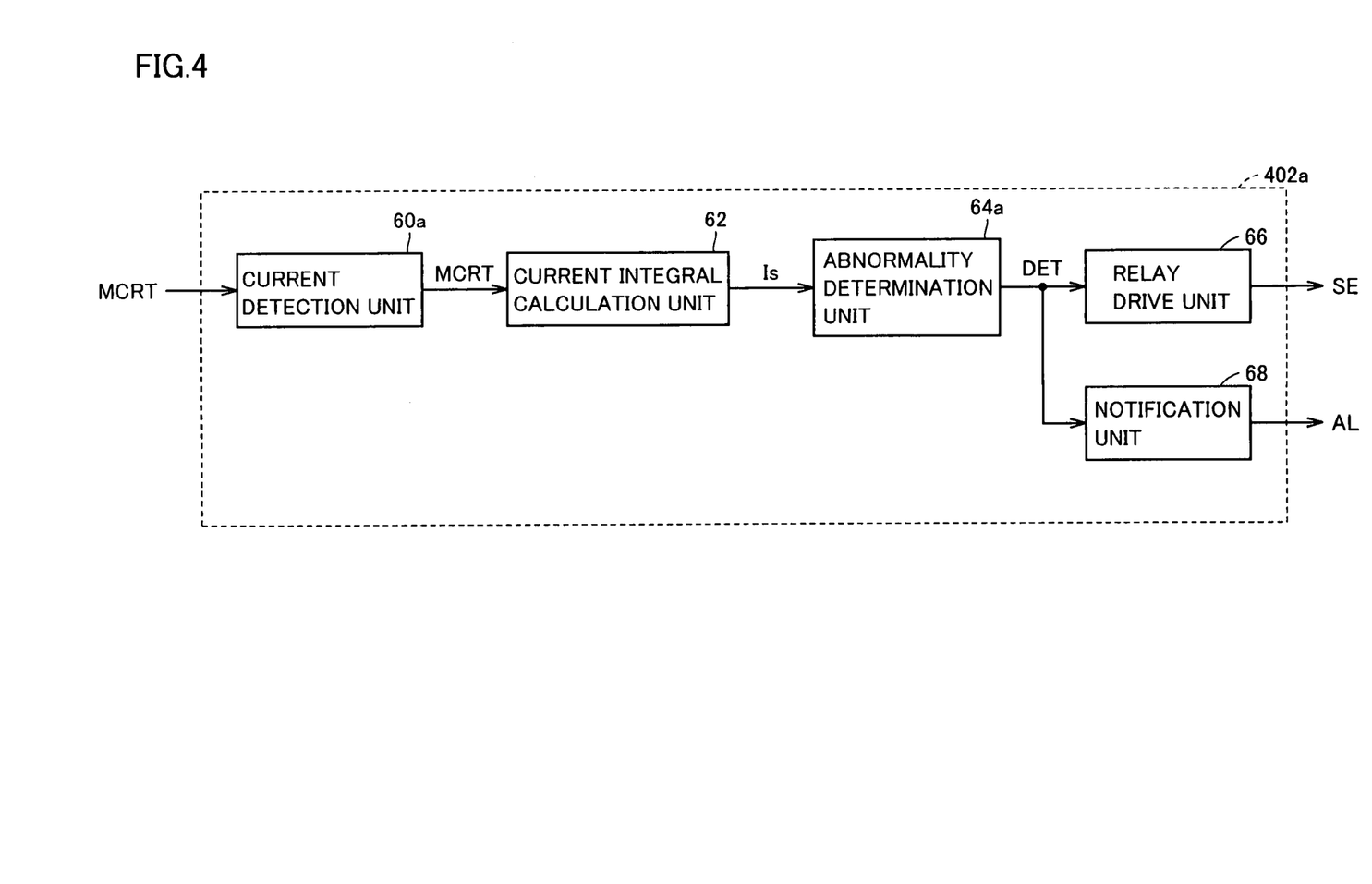
FIG. 4 is a block diagram of an abnormal current detection circuit 402a in FIG. 2.

FIG. 4 is a block diagram of abnormal current detection circuit 402a shown in FIG. 2.

Referring to FIG. 4, abnormal current detection circuit 402a includes a current detection unit 60a, a current integral calculation unit 62, an abnormality determination unit 64a, a relay drive unit 66, and a notification unit 68.

Current detection unit 60a receives motor current MCRT detected by current sensor 20 to sample motor current MCRT at every predetermined calculation cycle. The predetermined calculation cycle may arbitrarily be set by a user. It is preferable, in terms of accuracy in detecting an abnormality, the predetermined calculation cycle is set to correspond to a cycle of the highest processing speed of a CPU (Central Processing Unit) with which control device 40 is configured. The sampled motor current MCRT is output to current integral calculation unit 62.

Current integral calculation unit 62 calculates the integral of the sampled motor current MCRT over a period of time consumed for sampling (sampling period) to determine current integral Is. When the sampling period corresponds to N predetermined calculation cycles, current integral Is is represented by the following expression where T represents a sampling period corresponding to one of the predetermined calculation cycles.

$$Is = \sum_{n=0}^{N} (\text{value of motor current } MCRT \text{ sampled at } n\text{-th calculation cycle}) \times T \quad (1)$$

Current integral Is determined by expression (1) is output to abnormality determination unit 64a.

Receiving current integral Is, abnormality determination unit 64a determines whether there is an abnormality in motor current MCRT, based on whether current integral Is is larger or smaller than a predetermined threshold Is_std that is used as a reference value for detecting an abnormality.

Figure 5:
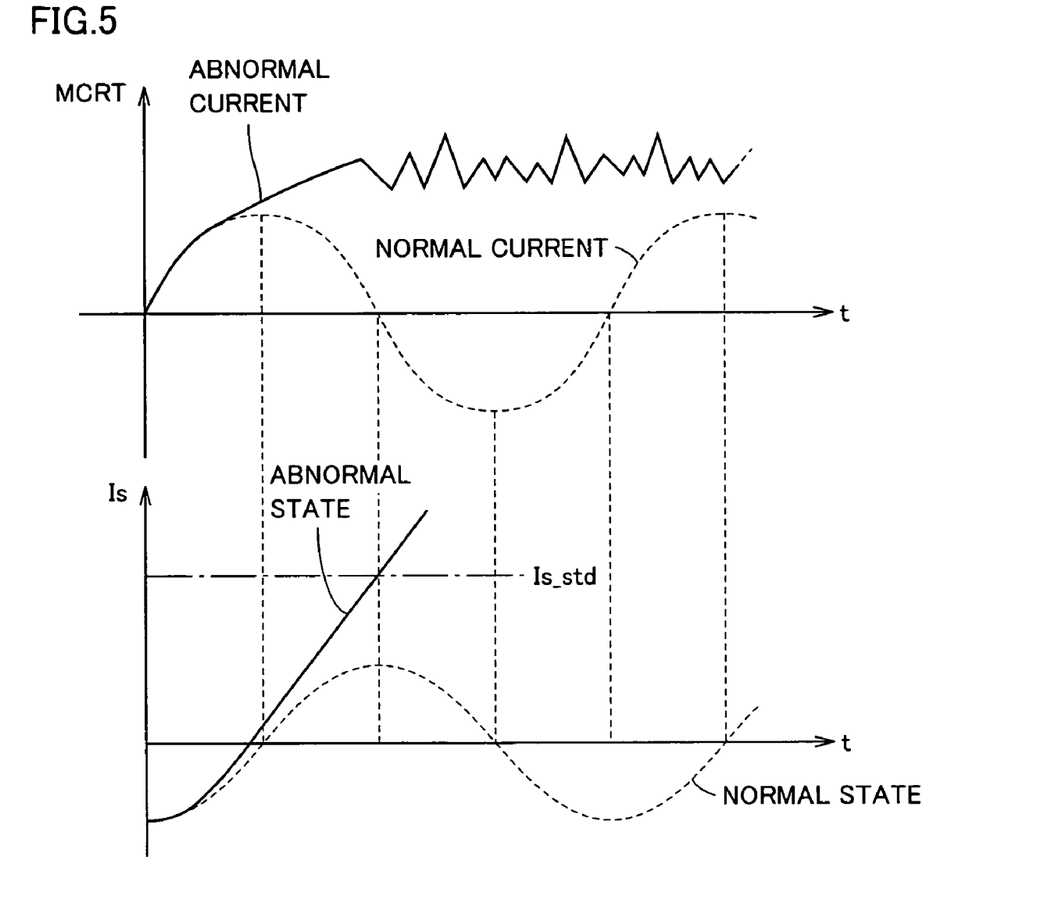
FIG. 5 is a schematic for illustrating the operation of detecting an abnormality by abnormal current detection circuit 402a in FIG. 4.

FIG. 5 is a schematic for illustrating the operation of detecting an abnormality by abnormal current detection circuit 402a shown in FIG. 4.

Referring to FIG. 5, when the power supply apparatus is in a normal state, motor current MCRT has the sinusoidal current waveform as indicated by the dotted line. In contrast, when any factor causes an abnormality in the power supply apparatus, the current waveform irregularly oscillates relative to the sinusoidal waveform as indicated by the solid line. In this case, as shown in FIG. 5, if the current continues to irregularly oscillate at a higher level than that of the normal current, overcurrent continuously flows in inverter 12, which could break inverter 12.

Then, abnormal current detection circuit 402a calculates the magnitude of a load exerted by motor current MCRT on inverter 12 to detect an abnormality in motor current MCRT based on the calculated magnitude of the load.

Specifically, referring to FIG. 5, when motor current MCRT has the normal sinusoidal waveform, current integral Is determined by integration of this waveform also has the sinusoidal waveform as indicated by the dotted line. In this case, the load on inverter 12 only increases and decreases periodically over a predetermined variation width and thus the load on inverter 12 is relatively small.

In contrast, when motor current MCRT has such a waveform of abnormal current as indicated by the solid line in FIG. 5, current integral Is is determined by integration of this waveform accordingly increases monotonously as indicated by the solid line. Accordingly, the load on inverter 12 also increases monotonously, which could break inverter 12.

Although the current waveform of motor current MCRT in an abnormal state includes, in addition to the waveform kept around the upper-limit level of the sinusoidal wave as shown in FIG. 5, any waveform momentarily indicating a high level for example, the current waveform is integrated in the same manner to determine current integral Is. Thus, the common reference that is the magnitude of the load on inverter 12 can be used for making comparisons between waveforms. Abnormality determination unit 64a defines current integral Is that exerts a predetermined load on inverter 12 as predetermined threshold Is_std, and detects that current integral Is exceeds this threshold Is_std to determine that motor current MCRT has an abnormality. Here, it is necessary to set this predetermined threshold Is_std lower than current integral Is that could cause inverter 12 to break.

With the above-described arrangement, an abnormality in motor current MCRT is detected based on the fact that the load on inverter 12 exceeds threshold Is_std. Thus, when motor current MCRT momentarily has a high current value that exerts a relatively small load on inverter 12, the motor current is not regarded as abnormal. Moreover, the abnormal current oscillating around the upper-limit level of the sinusoidal wave that has been difficult to detect by the conventional abnormality detection method can surely be detected. Thus, the accuracy in detecting an abnormality can be improved.

Referring again to FIG. 4, when abnormality determination unit 64a determines that motor current MCRT is abnormal, abnormality determination unit 64a generates a detection signal DET indicating that the abnormality is detected and outputs the generated detection signal DET to relay drive unit 66 and notification unit 68.

In response to detection signal DET, relay drive unit 66 generates signal SE for turning off system relays SR1, SR2 and outputs the signal to system relays SR1, SR2. As system relays SR1, SR2 are turned off according to signal SE, DC power supply B is disconnected from the power supply apparatus to prevent the abnormal current from flowing into inverter 12.

In response to detection signal DET, notification unit 68 generates a signal AL that is an alarm output for notifying a user of the occurrence of the abnormality and outputs the generated signal AL to the outside of the power supply apparatus. This output signal AL is transferred to display means (not shown) mounted on the vehicle to be converted into sound or image signal and output.

Figure 6:
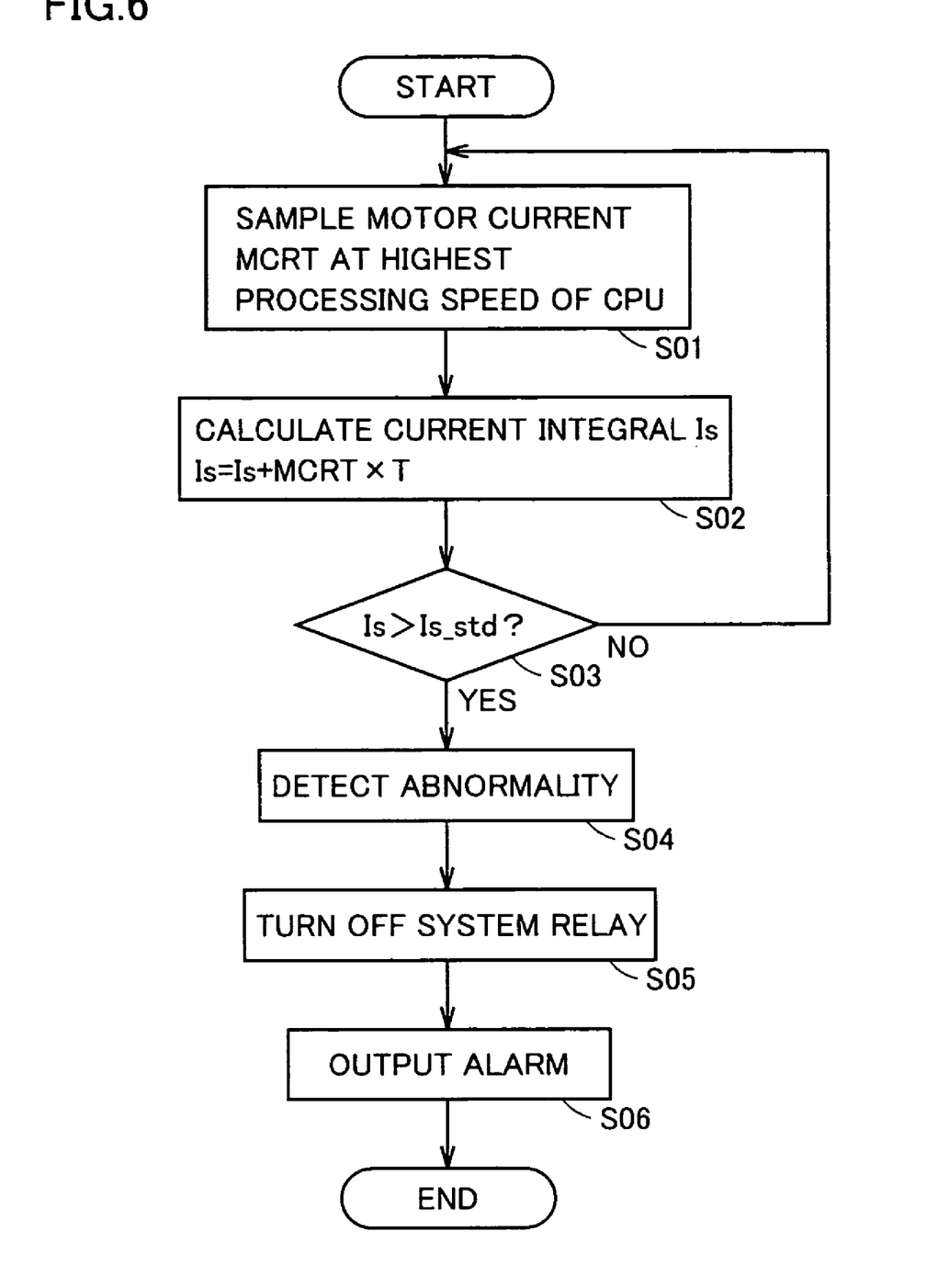
FIG. 6 is a flowchart for illustrating the operation of detecting abnormal current of the power supply apparatus according to the first embodiment.

FIG. 6 is a flowchart for illustrating the operation of detecting abnormal current of the power supply apparatus according to the first embodiment.

Referring to FIG. 6, current detection unit 60a samples motor current MCRT (step S01). The sampling cycle is set to a cycle of the highest processing speed of the CPU. The sampled motor current MCRT is output to current integral calculation unit 62.

Then, receiving the sampling value of motor current MCRT, current integral calculation unit 62 integrates the sampling value over each predetermined calculation cycle (sampling period T) to calculate current integral Is (step S02). The calculated current integral Is is output to abnormality determination unit 64a.

Receiving current integral Is, abnormality determination unit 64a determines whether current integral Is is larger than threshold Is_std (step S03).

In step S03, when it is determined that current integral Is is larger than threshold Is_std, abnormality determination unit 64a generates detection signal DET indicating that an abnormality in motor current MCRT is detected, and then outputs the generated detection signal DET to relay drive unit 66 and notification unit 68 (step S04).

Relay drive unit 66 receives detection signal DET to generate signal SE for turning off system relays SR1, SR2 and output the generated signal to system relays SR1, SR2. Accordingly, system relays SR1, SR2 are turned off (step S05).

Notification unit 68 receives detection signal DET to generate signal AL and output the signal to display means (not shown) provided outside the power supply apparatus (step S06). Thus, the user is informed of the occurrence of the abnormal current.

In step S03, when it is determined that current integral Is is equal to or smaller than threshold Is_std, the process returns to step S01 to continue the operation of calculating the current integral and comparison with threshold Is_std in steps S01 and S02.

As discussed above, according to the first embodiment of the present invention, the current integral of the motor current is calculated and it is determined that the motor current is abnormal based on the fact that the calculated current integral exceeds a predetermined threshold. Therefore, any abnormal current that could exert an excessive load on the inverter can be detected regardless of the waveform of the abnormal current, and thus reliability in terms of protection of the inverter can be improved.

Second Embodiment

Figure 7:
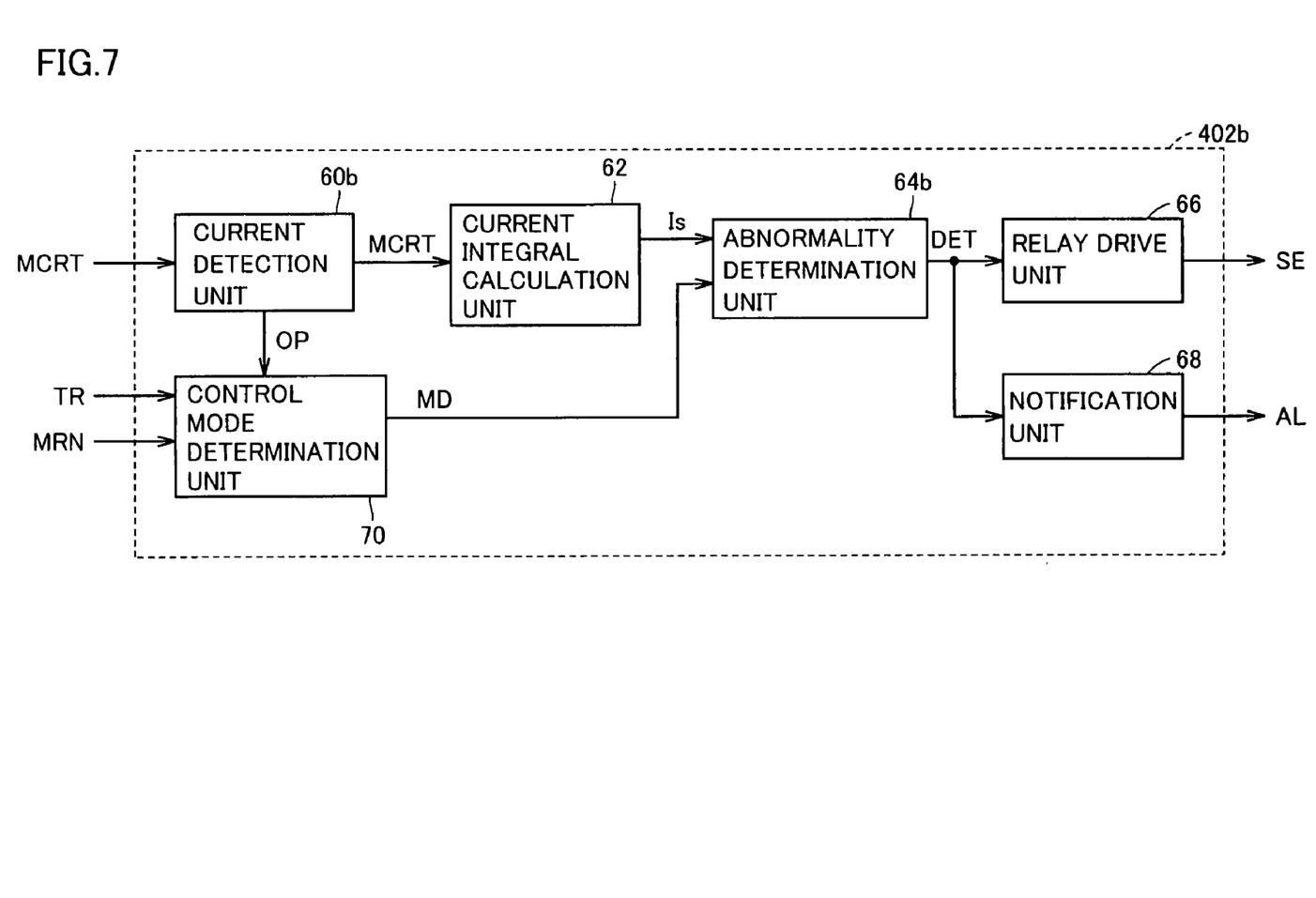
FIG. 7 is a block diagram of an abnormal current detection circuit of a power supply apparatus according to a second embodiment.

FIG. 7 is a block diagram of an abnormal current detection circuit of a power supply apparatus according to a second embodiment. Here, the power supply apparatus of the present embodiment is identical to the power supply apparatus shown in FIG. 1 except that abnormality detection circuit 402a is replaced with an abnormality detection circuit 402b, and the detailed description of the common component is not repeated here.

Referring to FIG. 7, abnormal current detection circuit 402b includes a current detection unit 60b, a current integral calculation unit 62, an abnormality determination unit 64b, a relay drive unit 66, a notification unit 68, and a control mode determination unit 70.

Current detection unit 60b samples, as current detection unit 60a in FIG. 1, motor current MCRT at every predetermined calculation cycle corresponding to a cycle of the highest processing speed of the CPU, and outputs the result of the sampling to current integral calculation unit 62.

As the first embodiment, current integral calculation unit 62 receives sampled motor current MCRT to calculate the integral of motor current MCRT over a sampling period to determine current integral Is.

Current detection unit 60b further has a predetermined threshold MCRT_std for detecting that the waveform of motor current MCRT is out of a normal operating range. Current detection unit 60b generates a signal OP for driving control mode determination unit 70 at a timing at which motor current MCRT exceeds this threshold MCRT_std and outputs the generated signal OP to control mode determination unit 70.

Control mode determination unit 70 receives signal OP from current detection unit 60b to determine what control mode AC motor M1 has, based on torque command value TR and motor revolution number MRN from an external ECU.

Here, the control mode of AC motor M1 of inverter 12 includes PWM control mode, overmodulation control mode and rectangular-wave control mode. These control modes are different from each other in frequency for turning on/off NPN transistors Q1-Q6 included in inverter 12 (the frequency is hereinafter "carrier frequency"). More specifically, the PWM control mode has the highest carrier frequency, the overmodulation control mode has the second highest carrier frequency and the rectangular-wave control mode has the lowest in carrier frequency.

Thus, depending on the control mode of AC motor M1 of inverter 12, motor current MCRT takes one of different current waveforms. Therefore, when an abnormality occurs in motor current MCRT, the degree of load exerted on inverter 12 varies depending on the control mode. For example, in the PWM control mode with the highest carrier frequency, the maximum load is exerted on inverter 12. In the rectangular-wave control mode with the lowest carrier frequency, the minimum load is exerted on inverter 12.

Accordingly, the present embodiment provides different references for determining whether an abnormality occurs in current for different control modes in consideration of the difference in degree of load on inverter 12. An abnormality can thus be detected precisely regardless of the current waveform of the abnormal current to strengthen the protection of inverter 12.

Figure 8:
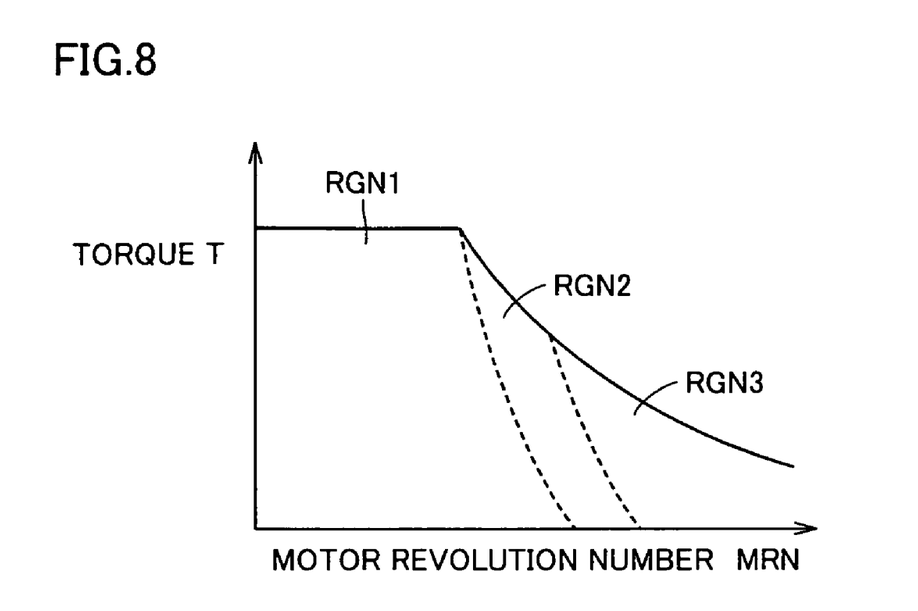
FIG. 8 shows a relation between torque T and motor revolution number MRN of an AC motor M1.

Referring to FIG. 8, a description is given of a method of determining the control mode of AC motor M1 by control mode determination unit 70. FIG. 8 shows a relation between torque T and motor revolution number MRN of AC motor M1.

Torque T of AC motor M1 is constant until the motor revolution number reaches a predetermined revolution number. After the predetermined revolution number is exceeded, torque T gradually decreases as motor revolution number MRN increases. A region RGN 1 indicates that the control mode of AC motor M1 is the PWM control mode, a region RGN 2 indicates that the control mode of AC motor M1 is the overmodulation control mode and a region RGN 3 indicates that the control mode of AC motor M1 is the rectangular-wave control mode.

Control mode determination unit 70 receives signal OP for driving control mode determination unit 70 that is provided from current detection unit 60b and receives torque command value TR and motor revolution number MRN from the external ECU to determine one of the regions in which the torque command value TR and motor revolution number MRN are included. Determining the control mode, control mode determination unit 70 generates a signal MD for indicating the determined control mode and outputs the generated signal MD to abnormality determination unit 62b.

Control mode determination unit 70 stores a map indicating the relation between torque T and motor revolution number MRN of the motor as shown in FIG. 8 and, upon receiving torque command value TR and motor revolution number MRN from the external ECU, searches for the region among regions RGN1-RGN3 in FIG. 8 in which the torque command value TR and motor revolution number MRN are included to determine which is the control mode of AC motor M1, among the PWM control mode, the overmodulation control mode and the rectangular-wave control mode.

Abnormality determination unit 64b receives signal MD from control mode determination unit 70 to set threshold Is_std based on the control mode indicated by signal MD.

Figure 9:
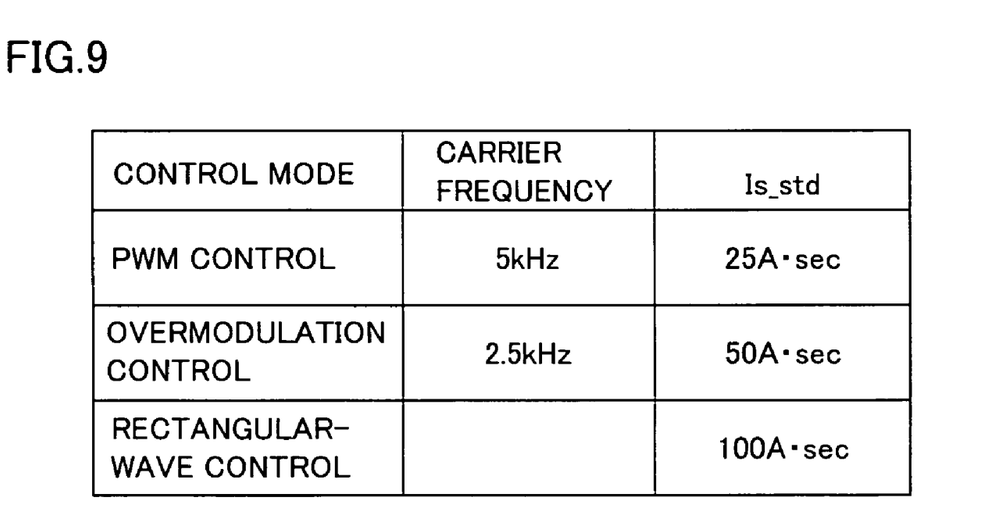
FIG. 9 shows a relation between the control mode of AC motor M1 and threshold $Is_{13}$ std.

FIG. 9 shows a relation between the control mode of AC motor M1 and threshold Is_std.

As shown in FIG. 9, based on the protection level of inverter 12 and respective carrier frequencies of the control modes, threshold Is_std is set to respective current values different from each other. Specifically, for the PWM control mode with the highest carrier frequency, threshold Is_std has the lowest value. For example, for a carrier frequency of 5 kHz, threshold Is_std is set to 25 A·sec. For the overmodulation control mode with the second highest carrier frequency, threshold Is_std has the second lowest value. For example, for a carrier frequency of 2.5 kHz, threshold Is_std is set to 50 A·sec. For the rectangular-wave control mode with the lowest carrier frequency, threshold Is_std has the lowest value that is for example 100 A·sec.

More specifically, abnormality determination unit 64b stores, in the form of a map, the correlation chart indicating the relation between the control mode of AC motor M1 and threshold Is_std shown in FIG. 9. Abnormality determination unit 63b receives signal MD from control mode determination unit 70 to select threshold Is_std corresponding to a control mode specified by this signal MD and accordingly determine threshold Is_std of this control mode.

Determining threshold Is_std, abnormality determination unit 63b determines whether current integral Is is larger than threshold Is_std as determined and determines whether motor current MCRT has an abnormality based on the result of the determination about the threshold.

Specifically, as the first embodiment, it is determined whether current integral Is is larger than threshold Is_std.

When it is determined that current integral Is is larger than threshold Is_std, abnormality determination unit 64b determines that motor current MCRT has an abnormality and outputs detection signal DET. In contrast, if current integral Is is equal to or lower than threshold Is_std, abnormality determination unit 64b continues the operation and determination of current integral Is.

Regarding relay drive unit 66 and notification unit 68, the above-description concerning the first embodiment is applied as well.

Figure 10:
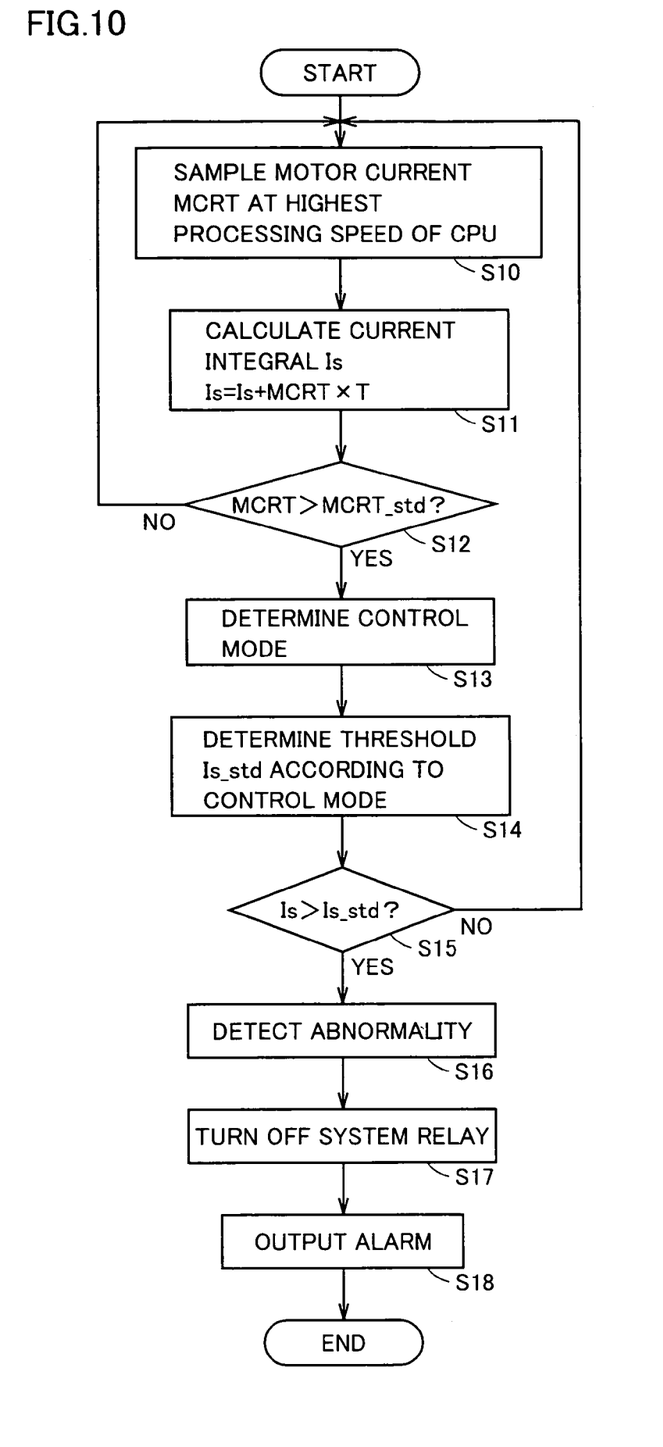
FIG. 10 is a flowchart for illustrating the operation of detecting abnormal current of the power supply apparatus according to the second embodiment.

FIG. 10 is a flowchart for illustrating the operation of detecting abnormal current of the power supply apparatus according to the second embodiment.

Referring to FIG. 10, initially current detection unit 60b samples motor current MCRT at every predetermined calculation cycle. The sampling cycle, which refers to the predetermined calculation cycle, is set to correspond to a cycle of the highest processing speed of the CPU (step S10). The sampled motor current MCRT is output to current integral calculation unit 62.

Current integral calculation unit 62 calculates the integral of the sampled motor current MCRT over a sampling period to determine current integral Is (step S11). Specifically, motor current MCRT is integrated over each sampling period T corresponding to each cycle period of the highest processing speed of the CPU and the integral is added to current integral Is to update the current integral Is.

In parallel with the sampling in step S10, current detection unit 60b determines whether the sampled motor current MCRT is larger than predetermined threshold MCRT_std (step S12): In step S12, when it is determined that motor current MCRT is larger than threshold MCRT_std, signal OP indicating that the motor current MCRT is larger than threshold MCRT_std is generated and the generated signal is output to control mode determination unit 70.

Control mode determination unit 70 receives signal OP to determine, based on torque command value TR and motor revolution number MRN from the external ECU, whether the control mode is the PWM control mode, overmodulation control mode or rectangular-wave control mode (step S13). Control mode determination unit 70 generates signal MD indicating the determined control mode and outputs the generated signal MD to abnormality determination unit 64b.

Abnormality determination unit 64b receives current integral Is from current detection unit 60b and receives signal MD from control mode determination unit 70 to select, from the map shown in FIG. 9, threshold Is_std corresponding to the control mode designated by signal MD and accordingly determine threshold Is_std (step S14).

Then, abnormality determination unit 64b determines whether current integral Is is larger than threshold Is_std as determined (step S15).

In step S15, when it is determined that current integral Is is larger than threshold Is_std, abnormality determination unit 64b generates detection signal DET indicating that an abnormality in motor current MCRT is detected, and outputs the generated detection signal DET to relay drive unit 66 and notification unit 68 (step S16).

Relay drive unit 66 receives detection signal DET to generate signal SE for turning off system relays SR1, SR2 and output the generated signal to system relays SR1, SR2. Accordingly, system relays SR1, SR2 are turned off (step S17).

Notification unit 68 receives detection signal DET to generate signal AL and output the signal to display means provided outside power supply apparatus 100. Thus the user is notified of the occurrence of the abnormal current (step S18). Subsequent steps are similar to the corresponding ones of the first embodiment.

In step S15, when it is determined that current integral Is is equal to or smaller than threshold Is_std, the process returns to step S10 to continue the sampling of motor current MCRT, calculation of current integral Is and comparison with threshold Is_std in steps S10 to S14.

As heretofore discussed, according to the second embodiment of the present invention, the threshold value of the current integral is adjusted depending on the control mode of the AC motor so that an abnormality can precisely be detected regardless of the waveform of abnormal current and the inverter can surely be protected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus comprising:
   a power supply;
   a drive circuit receiving electric power from said power supply to drive a load circuit; and
   an abnormal current detection circuit detecting an abnormality in drive current flowing in said drive circuit, said abnormal current detection circuit includes:
   current detection means for sampling said drive current at every predetermined calculation cycle;
   current integral calculation means for integrating said sampled drive current over a plurality of said predetermined calculation cycles consumed for the sampling to calculate the current integral of said drive current; and
   abnormality determination means for determining whether the current integral of said drive current is larger than said predetermined threshold,
   wherein said load circuit includes an AC motor,
   said abnormal current detection circuit includes mode determination means for determining a control mode of said AC motor,
   said mode determination means determines a control mode of said AC motor when said drive current that is out of a normal operating range flows, and
   said abnormality determination means adjusts said predetermined threshold to an appropriate threshold that is appropriate for said determined control mode, determines whether the current integral of said drive current is larger than said appropriate threshold, detects that the current integral of said drive current is larger than said appropriate threshold, and determines that said drive current is abnormal.

2. The power supply apparatus according to claim 1, wherein
   said mode determination means determines the control mode among control modes with respective carrier frequencies different from each other.

3. The power supply apparatus according to claim 2, wherein
   said abnormality determination means adjusts said threshold according to the carrier frequency of said determined control mode.

* * * * *